W. S. McIlhenney,
Making Teeth.
N° 8,829.   Patented Mar. 23, 1852.
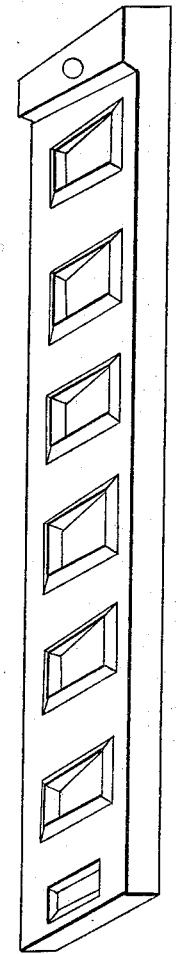
No. 1.
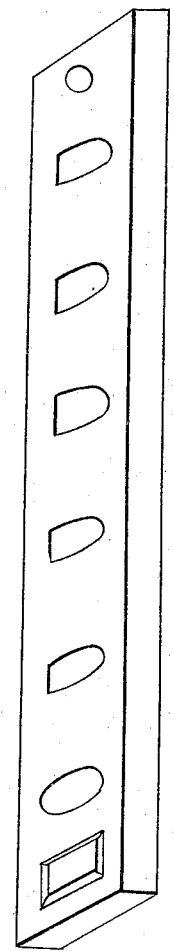
No. 2.

UNITED STATES PATENT OFFICE.

WILLIAM S. McILHENNEY, OF PHILADELPHIA, PENNSYLVANIA.

MANUFACTURING ARTIFICIAL TEETH.

Specification of Letters Patent No. 8,829, dated March 23, 1852.

*To all whom it may concern:*

Be it known that I, WM. S. MCILHENNEY, of Philadelphia, in the county of Philadelphia and State of Pennsylvania, have invented a new and Improved Mode of Manufacturing Artificial Teeth; and I do hereby declare that the following is a full and exact description thereof, reference being had to the accompanying drawings and to the letters of reference marked thereon.

The nature of my invention consists in the manufacture of a tooth or teeth, into a condition ready for the furnace, by the simple process of molding.

To enable others skilled in the art to make and use my invention I will proceed to describe its operation.

The first process is to place the material while in a plastic condition into the respective molds, the material intended for the back of the tooth, composition No. 1, is to be worked or packed into the mold as represented in Figure 1. The portion intended for the face of the tooth (colored to whatever tint that may be desired) is placed in the same manner, and in the same condition into the mold as represented in Fig. 2, composition of material No. 2. They are then joined and pressed with sufficient force to make the tooth compact, and in this condition left to dry. When taken from the molds they are ready for the furnace.

*Composition No. 1.*

℞.
Dis. feld spar _____ 60 dwt.
Feld spar _____ 20 dwt.
Quartz _____ 20 dwt.
White nile clay _____ 3.8 grs.
Titanium _____ 12 grs. M.

*Composition No. 2.*

℞.
A. Dis. feld spar _____ 2 dwt.
Feld spar _____ 2 dwt.
Quartz _____ 1 dwt.
Crown glass __ ½ dwt. M.
B. Dis. feld spar _____ 4 dwt.
Feld spar __ 1 dwt., 4 grs.
Quartz _____ 1 dwt., 4 grs.
White nile clay _ 4 grs. M.

Unite A and B in the above proportions, composition No. 2.

In order to exhibit the advantages of the improvement, a description of the method at present in use would not be inappropriate. In the first place the molding is performed in something of the same manner but of one material only, forming the base of the tooth which after drying, and secondly trimming, thirdly baking unto a red heat for the purpose of driving the watery particles out, preparing it for the fourth operation, enameling, a process difficult in itself and requiring two distinct materials— one for the base and one for the joint; a second drying operation is now required, after this the fifth of trimming the enamel to the proper shape. These various operations, difficult, tedious, and requiring much time, are entirely superseded by one operation, and that the most simple.

What I claim as my invention, and desire to secure by Letters Patent, is—

The formation of an artificial tooth or teeth, from spar, silex, clay, sand, glass, or any materials used for the above purpose, into a suitable condition for the finishing furnace, by the simple operation of molding, thereby avoiding the tedious and uncertain process of enameling.

WM. S. McILHENNEY.

Witnesses:
J. MITCHELL,
JOE. McINHENNEY.